UNITED STATES PATENT OFFICE.

ELIJAH A. WILDER, OF DENNYSVILLE, MAINE.

IMPROVEMENT IN MEDICINE FOR CURE OF DISEASES IN CATTLE.

Specification forming part of Letters Patent No. 104,677, dated June 21, 1870.

*To all persons to whom these presents may come:*

Be it known that I, ELIJAH A. WILDER, of Dennysville, in the county of Washington and State of Maine, have invented a new and useful composition for the cure or alleviation of various diseases incident to horses, cattle, or other animals; and do hereby declare the same and the method of compounding it to be fully described, as follows:

The ingredients of such composition may be thus enumerated, it being understood that equal portions, by weight, of them are employed. They are regalus of antimony, flour of sulphur, sulphate of potash or niter, common resin or rosin, Paris white, fenugreek, pimento.

Each of the said articles is first to be thoroughly pulverized or reduced to a very fine powder, the finer the better, after which they should be thoroughly stirred together or incorporated. The compound then will be ready for use.

It is what may be termed "constitution powders," its purpose being mainly for the destruction of worms in the stomach and intestines of a horse, and for improving the animal in health and giving to him a smooth hair or coat. It also is useful for the cure or alleviation of various diseases or ailments to which horses or other animals are subject.

The dose to be given to a horse is about a table-spoonful and a half per day, mixed with his food, which may be repeated for about six days, such being generally sufficient.

I claim the above composition as my invention, to be used for the purpose as explained.

ELIJAH A. WILDER.

Witnesses:
R. H. EDDY,
J. R. SNOW.